W. SEWARD.
MOLD FOR VULCANIZING PNEUMATIC TIRES.
APPLICATION FILED SEPT. 22, 1919.

1,380,425.

Patented June 7, 1921.
2 SHEETS—SHEET 1.

William Seward,
By Henry J. Brewington
Attorney

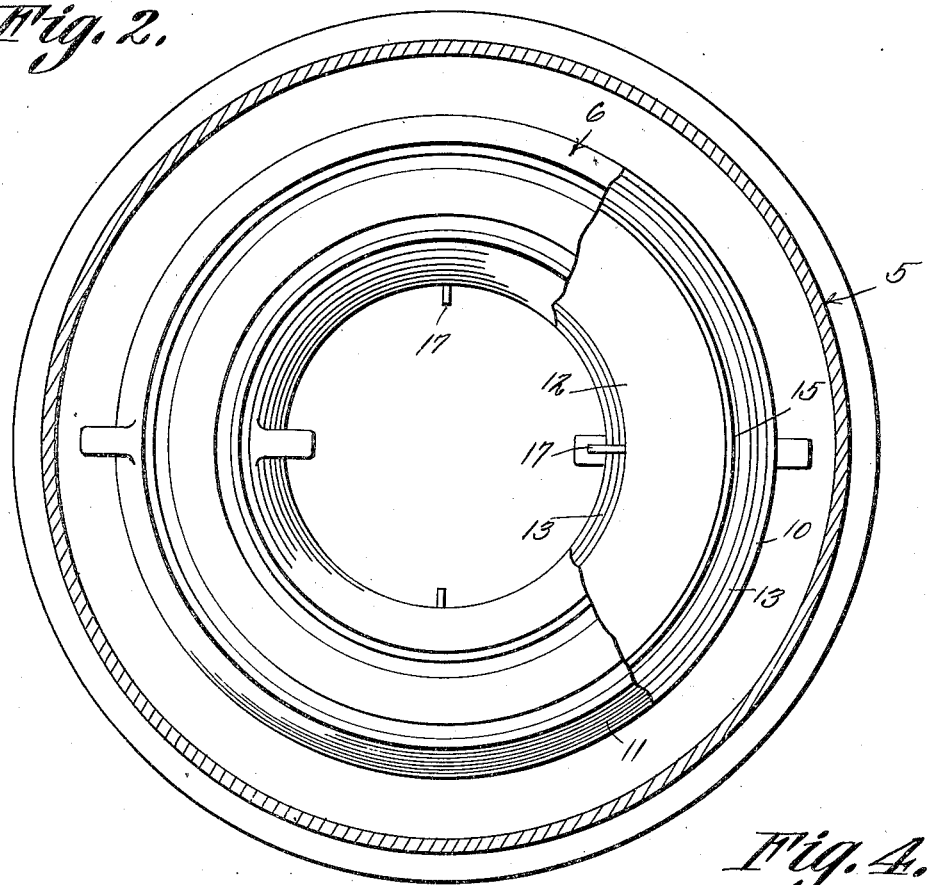
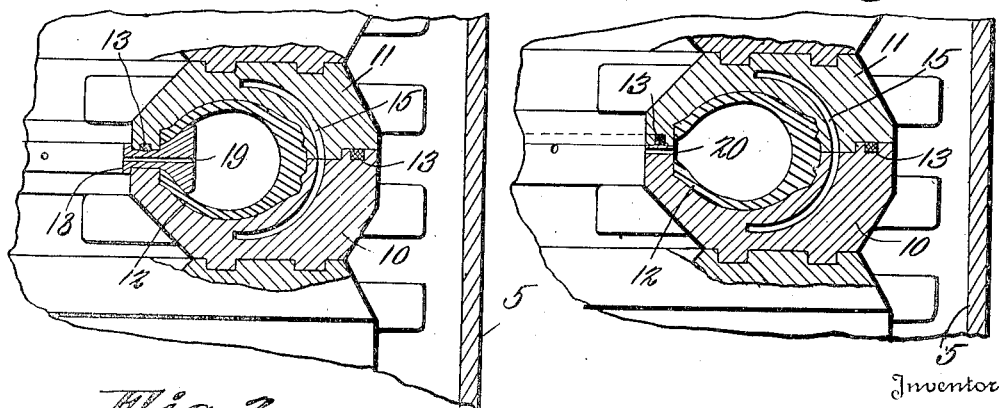

UNITED STATES PATENT OFFICE.

WILLIAM SEWARD, OF BALTIMORE, MARYLAND.

MOLD FOR VULCANIZING PNEUMATIC TIRES.

1,380,425.   Specification of Letters Patent.   Patented June 7, 1921.

Application filed September 22, 1919. Serial No. 325,504.

*To all whom it may concern:*

Be it known that I, WILLIAM SEWARD, a citizen of the United States, residing at Baltimore city, State of Maryland, have invented certain new and useful Improvements in Molds for Vulcanizing Pneumatic Tires, of which the following is a specification.

This invention relates to the art of vulcanizing or curing rubber and analogous products, and more particularly to the vulcanization or cure of the outer casing or the shoe of pneumatic tires.

The object of the invention is to improve the vulcanizing or curing process, and thereby obtain a better product and one less liable to be defective.

In order that the invention may be better understood, reference is had to the accompanying drawings, forming a part of this specification, and in said drawings, Figure 1 is a sectional view of the apparatus employed in carrying out the invention;

Fig. 2 is a horizontal section on the line 2—2 of Fig. 1, and

Figs. 3 and 4 are sectional views showing modifications of the apparatus.

Figure 1:
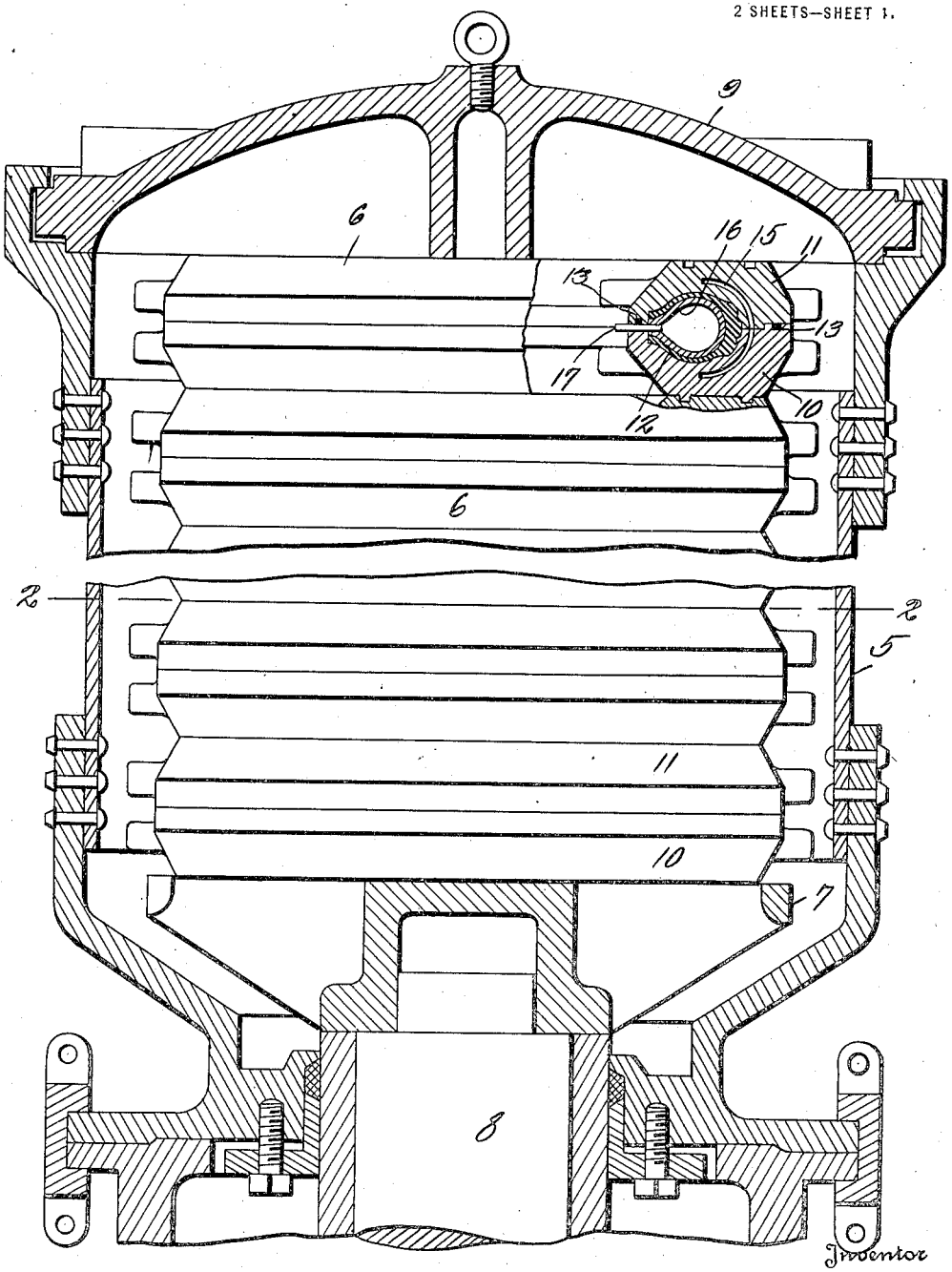

The prevailing standard method of manufacturing pneumatic tire casings consists in building the casings on a form or core to proper dimensions and gages, according to their particular specification before being finally vulcanized and finished. The casing is then ready to be placed in a mold, or an exterior container or former of outside contour, for the final process of vulcanization or curing. This final process consists in subjecting the mass of rubber and rubberized fabric comprising the casing to a certain degree of heat for a certain period. The heat is obtained from any suitable source, usually steam, which is introduced into a receptacle known as a " heater " or " vulcanizing pot " in which the molds containing the casings to be treated are placed. A plurality of molds, in superimposed relation, is placed in the heater and pressed and held together firmly by hydraulic pressure. Such a heater is shown in the drawings at 5, and the mold units inclosed therein at 6, the latter being supported on the head or table 7 of a hydraulic ram 8. The mold units are pressed up against the top 9 of the heater by the hydraulic pressure transmitted by the ram 8 and its head 7. Each mold unit is composed of two superimposed sections 10 and 11, respectively.

A tire casing may be formed and cured in several ways. By the " wrapped tread " process the exterior contour is produced by wrapping plies of fabric over and around the casing which has previously been built up on an iron core; or the casing can be cured by what is known as the " full molded " process. Another process is termed the " air bag " process, and there is also practised what is known as the " hydraulic " cure which is merely the substitution of a volume of water forced into the casing and held there during vulcanization, thus exercising the same function as a metal core or an air bag, these functions being the act of determining the inner dimensions of the tire casing, whether such dimensions are determined by the rigid iron core within the casing, or by the internal air, water or gaseous pressure maintained throughout the vulcanizing period in the individual mold containing the casing to be cured.

These processes are all lacking in a sureness of result, so far as a perfect and uniform product is concerned, *e. g.*:

Unless all dimensions and gages are essentially correct, a "full molded" or a "wrapped tread" casing will show what is termed "buckles" or "waves" in the fabric plies. If the material contained between the inner core and the outer mold or outer wrapping is excessive or if it is not quite sufficient or up to gage, a faulty product is the result.

In using the " air bag " system, the core upon which the casing has been built is removed and an " air bag " is introduced to replace the same during vulcanization. The air bag contains air or steam under pressure. This method eliminates "waves," "buckles," etc., but it is uncertain and hazardous, for if the bag bursts under pressure, a defective product is the result; or lack of internal pressure from any cause will result in a casing not completely filling the mold; or the leakage or reduction of any internal pressure will cause a retardation of vulcanization at some point. In either case the product is rendered defective.

Many methods have been tried in the endeavor to overcome the hazard of the "air bag" method, which is the preferred method as it produces the most excellent type of tire casing, but all efforts have been confined to the endeavor to isolate and confine necessary internal pressure to the individual tire casing, whether such pressure is transmitted from the outside of the heater or is contained within the casing in an "air bag" or an "air container," assisted at times by the pressure resulting from vaporization of water introduced before vulcanization has begun, but which is raised above the boiling point during vulcanization.

The present invention has for its object the elimination of all manufacturing losses attending the faults and hazards of any and all of the present known methods. It entirely eliminates "buckles," "waves" and other defects resulting from the "full molded" process; it is more economical and surer of good results than the "wrapped" process, and it insures a perfect product when applied to the "air bag" process. The invention also renders unnecessary the bolting together of the mold units in order to retain the pressure in the "air bag," and it makes unnecessary any nesting of mold units by cross bars and long bolts. The invention also renders unnecessary a pressure retaining valve on the individual "air bag" itself, and it does away with the expensive and generally unsatisfactory method of maintaining pressure in an "air bag" by means of a pressure transmitting device such as a tubing or piping to the individual bag, and it will prolong the life of any bag to a point where the present very considerable cost per casing cured on an "air bag" is reduced to a most insignificant figure.

In carrying out the present invention, the molds 6 for the tire casings 12 are made absolutely airtight on the outside of the latter by any means, such as the introduction of suitable gaskets 13 between the contiguous faces of the sections 10 and 11 of the molds, these gaskets being adjacent to the inner and outer circumferences of the molds. Each mold unit 6 also is formed with an internal overflow chamber 15 of proper and predetermined cubic contents, so that the normal and natural functions of the mold may be carried on so far as its ability to expel trapped air or excess stock is concerned. In connection with this mold structure an "air bag" 16 is used having a free and open inlet 17 to the interior of the vulcanizing chamber or pot 5. The mold units 6 are held by the ram 8 as hereinbefore described.

It will be evident from the foregoing that the fluid pressure and heat in the chamber 5 enters the bag 16 through the inlet 17, whereby the bag is distended to expand the casing 12 to the wall of the mold 6. The fluid pressure and heating medium in the chamber 5 is obtained from any suitable source, and it is composed of compressed air and steam in combination. As the mold is held together air tight, the pressure in the chamber 5 entering the bag 16 provides all necessary internal pressure by which to properly form up the casing, and the heat from the steam properly controlled by heat regulating devices, will furnish any desired vulcanizing temperature. The use of the composite gaseous fluid pressure consisting of compressed air and steam as the pressure and heating mediums, results in an action which is radically different from the action of steam alone, for the reason that by the former any desired pressure at any temperature is readily obtainable. As is well known, the temperature of steam is governed by its pressure; or, conversely, the pressure of steam depends on its temperature. Water, at any temperature below boiling point, does not exert any pressure aside from its weight, or unless it is confined and subjected to pressure. By the use of air as the pressure producing medium and steam as the heating medium, it is possible to obtain in the vulcanizer a temperature of say, 290 degrees F. and a pressure of one hundred pounds, or in fact any pressure at any temperature contingent only on the strength of the container, a condition absolutely impossible to obtain with the use of water or steam. Steam alone always has a certain pressure according to its temperature, and hence if a pressure of say, eighty pounds at a temperature of 290 degrees F. is desired in the vulcanizer, the use of steam alone would not produce this result, as steam at a temperature of 290 degrees F. has a pressure of only forty five pounds, approximately. However, by using steam at the stated temperature, and combining therewith air compressed to a degree to produce a pressure equal to the difference between the steam pressure at 290 degrees F. (45 pounds) and the desired pressure of eighty pounds, it is possible to obtain entirely satisfactory results. The pressure of steam alone at a temperature necessary for a successful vulcanizing operation is entirely insufficient.

A further advantage arising from the use of steam and compressed air is that for any predetermined cubic content there is present only approximately fifty per cent. as much moisture as would be contained in the same space were it filled with steam alone, and as the vulcanizing period proceeds, a maintenance of temperature and pressure will automatically reduce the moisture percentage. In the event of accident to the steam supply, the air pressure will still exert sufficient internal pressure in the tire casing within the mold to prevent collapse thereof. Furthermore, by the use of steam alone, the condensation thereof will produce a partial vacuum, whereas the composite gaseous fluid (steam and air) employed in the present process will not act in this manner, due to the presence of the air and it will give absolutely any combination of temperature and pressure which may be desired to fulfil the many varying heats and pressures necessary in vulcanizing processes. The number and combinations of pressure and temperature possible to obtain is practically infinite, whereas water or steam alone have positive and absolute limitations.

The mold can be built in a usual and standard manner, but instead of the usual and necessary overflow cavity being prepared, which leads finally to the outside of the mold, and instead of the usual method of permitting excess stock or trapped air to escape into and through the usual overflow cavity to the outside of the mold, the present invention contemplates the expelling of such excess into the internal overflow chamber 15, the latter being within the outer gasket 13 hereinbefore mentioned. The flow of excess stock or trapped air may be started by external mold pressure or internal fluid pressure, but it must find an outlet, and hence it will be forced and finally make its way into the chamber 15. As the pressure contained in the chamber is normal and atmospheric, it will permit of certain compression, and as the internal pressure in the vulcanizer is greater, and as this greater pressure has entered the bag 16, room is thus provided in the chamber 15 for any excess stock or any trapped air.

The invention also permits absolute elimination of the "air bag." This is done by combining with the mold 6, an inner bead forming ring 18 shown in Fig. 3. This ring is shaped to conform to any desired contour of the inner sides of the beads of the tire casing, and it is placed naturally within the protection of the inner sealing gasket 13. The ring 18 has openings 19 for admitting the fluid pressure to the inside of the tire casing 12 to distend the same in the same manner this was done by the "air bag" 16, and expelling all excess and trapped air into the internal overflow chamber 15 as before.

Fig. 4 shows a mold 6 for tire casings in which the carcass and the tread are separately made and then united, the process being known as the "double cure." No air bag is used, and the fluid pressure enters the casing 12 within the mold through ports 20 in the latter.

The process disclosed in the present application is claimed in a copending application, Serial No. 325,505, filed Sept. 22, 1919.

I claim:

1. A tire-casing vulcanizing apparatus, comprising a vulcanizing chamber which is fluid-tight to hold a gaseous fluid-pressure and steam, a mold in said chamber, and means for conducting gaseous fluid pressure and steam from said chamber into the casing for inflating the same in the mold.

2. A tire-casing vulcanizing apparatus, comprising a vulcanizing chamber which is fluid-tight to hold a fluid-pressure, a mold in said chamber having an internal escape chamber for excess stock and trapped air, said chamber being sealed against the entry of fluid pressure from the vulcanizing chamber, and means for conducting fluid pressure from the vulcanizing chamber into the casing for inflating the same in the mold.

3. A tire-casing vulcanizing apparatus, comprising a vulcanizing chamber which is fluid-tight to hold a gaseous fluid-pressure and steam, a mold in the chamber for forming the exterior of the casing, and means for admitting gaseous fluid pressure and steam into the mold from the vulcanizing chamber to inflate the casing in the mold.

4. A tire-casing vulcanizing apparatus, comprising a vulcanizing chamber which is fluid-tight to hold a gaseous fluid-pressure and steam, a mold in the chamber for forming the exterior of the casing, and means for inflating the casing in the mold, the inflating agent being obtained solely from the gaseous fluid pressure and steam within the vulcanizing chamber.

5. A tire casing vulcanizing apparatus, comprising a vulcanizing chamber which is fluid-tight to hold a gaseous fluid pressure and steam, a mold in said chamber, said mold being fluid-tight to exclude pressure from without, and means permitting equality of pressure and heat to be constantly maintained at all times between the inside of the tire casing in said mold and that contained in the vulcanizing chamber.

In testimony whereof I affix my signature in the presence of two witnesses.

WILLIAM SEWARD.

Witnesses:
 E. WALTON BREWINGTON,
 HOWARD D. ADAMS.